July 15, 1969 V. BURTON 3,456,073

METHOD AND MEANS FOR TELEVISION PRESENTATION OF MOTION PICTURE FILM

Filed March 26, 1965

INVENTOR.
VAL BURTON,
By Edmond F. Shanahan
ATTORNEY.

3,456,073

METHOD AND MEANS FOR TELEVISION PRESENTATION OF MOTION PICTURE FILM

Val Burton, West Los Angeles, Calif., assignor to Triangle Business Machines, Inc., a corporation of California Filed Mar. 26, 1965, Ser. No. 443,042
Int. Cl. H04n 5/36
U.S. Cl. 178—7.2 6 Claims

ABSTRACT OF THE DISCLOSURE

A television display system is described for operation in association with a conventional receiver through which somewhat-conventional motion picture film is exhibited. A flying-spot beam scans the film transversely as it moves longitudinally while a photosensitive apparatus monitors the light passing through the film, to provide a video signal. The boundaries of each film frame are defined by areas of light density outside the video range, e.g. "blacker than black" and impingement thereon by the scanning beam is sensed to formulate television synchronizing signals. An oscillator provides a signal selected for an "open" or unused channel of the receiver to which the synchronizing and video components are modulated. Audio is provided from a magnetic recording track on the film which is driven by grooved rollers to thereby preserve the film emulsion.

The device described herein embodies a novel method and means for viewing specially prepared motion picture films on conventional television receivers. Its purpose is to translate images previously recorded on conventional emulsion film to electronic signals capable of being viewed on an unused channel of a standard television receiver. Pre-recorded audio signals accompany the video and are reproduced within the device.

The device, referred to herein as a converter box, employs a film transport mechanism which moves the specially pre-recorded film past a scanning beam. The film motion is continuous as in the manner of a conventional tape recorder, rather than articulated as in the manner of a motion picture projector. The film is moved by means of a pinch wheel-capstan arrangement familiar to one versed in audio tape recorded mechanisms.

On the film, transverse frame boundaries constitute vertical scanning synchronization signals and longitudinal edge boundaries constitute horizontal scanning synchronization signals which are recorded in an optical density range outside of the range of optical intensities of the film image itself. The restricted grey scale of image is necessary so that the synchronization boundaries are effective in signalling the synchronization pulses required for proper operation of the image reproducing television set.

In the following description of a typical embodiment of the invention, reference will be made to particular rates and dimensions, which are especially suited to the television standards in the United States; however, it should be understood that the invention is not limited to the particular rates and dimensions used in the description.

The scanning beam is generated by a cathode ray tube which projects an unmodulated spot on the moving film. The spot scans the film and synchronizing boundaries in a direction transverse to the motion of the film.

The scanning beam is driven at a linear rate of 15.75 kilocycles per second. As the beam passes through the film, the pre-recorded images modulate the beam. This modulated beam is focused on a photo detector which converts the varying intensity beam to electrical signals which are used to amplitude modulate a radio frequency oscillator which radiates a lower power signal on the frequency of an unused television channel. When the scanning beam passes over the transverse or longitudinal frame boundaries which lie in a range of optical opacity or transparency outside of the film image grey scale, the photo detector generates unique signals which form a train of signals in series with the video information. The horizontal frame boundary produces the television horizontal synchronizing signal at a rate of one every $\frac{1}{15750}$ second; i.e., every time the scanning beam moves across the film.

The duration of the horizontal synchronizing signal is determined by the width of the horizontal frame boundary and distance which the scanning beam moves into this region.

The vertical frame boundaries which occupy the spaces between frames produce the television vertical synchronizing signal at a rate of approximately one every $\frac{1}{60}$ second. This rate is determined by the film transport speed. The duration of the vertical synchronizing signal is determined by the spacing between frames.

The film format and film transport speed are chosen so that synchronizing signals appropriate to conventional television operation are produced. Typically, film transport speed of 7.5 inches per second, frame size of .125 inch long by .157 inch wide, frame spacing of .007 inch, and a horizontal frame boundary of .001 inch may be used.

In order to permit highest resolution of the film image, the scanning spot size must be held to a minimum, typically .0005 on the surface of the film, and the photo detector and following electronic circuits should have a bandwidth of 2.5 mc. or greater.

FIGURE 1 shows the converter box and film magazine in relation to a conventional television receiver;

FIGURES 2, 2*a*, and 2*b* show major mechanical elements of the converter box and film magazine;

Figures 1, 2, 2A, 2B, 3:
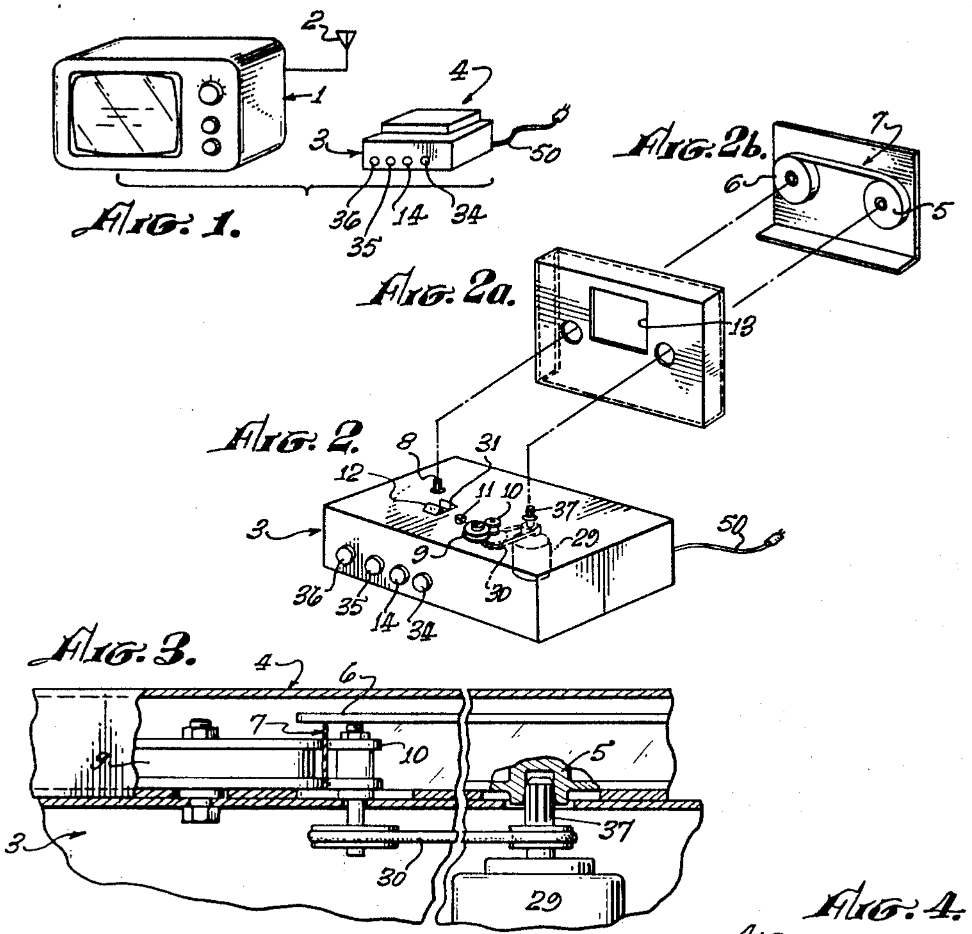
FIGURE 3 shows a cross section of the film driving mechanism.

In FIGURE 1, film magazine 4 is in place on the converter box 3. Converter box 3 receives its power through power cord 50, typically connected to 110 volts AC. Film magazine 4 contains a photographically produced continuous film on which is recorded video, audio and synchronizing information. The function of converter box 3 is to convert and transmit the information on the film in a form capable of being received on an unused channel of television receiver 1, over its standard antenna 2.

FIGURE 2 shows elements of the converter box 3 and film magazine 4. In this figure the film magazine is spaced away from the converter box for clarity of illustration. In the film magazine 4, the film 7 is stored on supply reel 6. It passes over opening 13 and onto take-up reel 5. When the film magazine is emplaced on the converter box 3, mirrors 12 and 31, audio read head 11, capstan 10, and pinch wheel 9 protrude through opening 13. The film 7 in the magazine 4 fits between mirrors 12 and 31 and between capstan 10 and pinch wheel 9. The hub axis of supply reel 6 fits over splined brake spindle 8. This spindle supplies a retardation force to properly tension the film as it is unreeled from supply reel 6. The hub axis of take-up reel 5 fits over splined drive shaft 37 which is connected to drive motor 29 through an internal clutch. This arrangement permits the translational speed of the film to be controlled by the rotational speed of the capstan. It will be recognized that this arrangement is similar to conventional audio tape recorder transport drive mechanisms. As will be seen in subsequent figures, control 34 positions the scanning beam, control 35 adjusts the audio level, and control 36 adjusts scanning beam current. Control 14 is a switch which supplies current to drive motor 29 from power cord 50, which is typically connected to 110 volts AC.

When switch 14 is closed and the drive mechanism is activated, the capstan and pinch wheel 10 and 9 are brought into contact with film 7 as shown in FIGURE 3 by suitable mechanical linkage. The capstan 10 is driven by motor 29 through the belt 30. The capstan 10 and pinch wheel 9 are shaped so that the film is contacted only at its edges to minimize scratching of the emulsion. The pinch wheel itself is fabricated typically by surrounding a metal drum with a soft rubber outer face. The rotational speed of the capstan 10 can be stabilized by including high moment of inertia members in the rotating drive mechanism which includes motor 29 belt 30, capstan 10 and pinch wheel 9.

Figure 4:
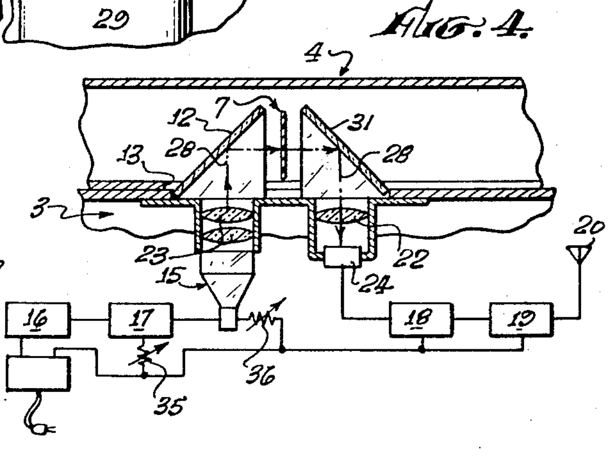
FIGURE 4 shows the scanning system and the video electronic elements.

In FIGURE 4, magazine 4 is shown emplaced on a converter box 3. The film 7 is moved as previously described past mirrors 12 and 31. A 15.75 kilocycle-per-second saw tooth oscillator 16 drives deflection circuits 17 which in turn are used to move a beam across the face of cathode ray tube 15. This beam describes a single line which has a blanked retrace time of approximately 10 microseconds. This beam is controlled in intensity by control 36 and is focused optically into a beam whose maximum excursion is approximately the width of film 7 by means of lenses 23. The beam thus produced is reflected on mirror 12 through film 7. Mirror 31 reflects the beam, now modulated in intensity by the varying transparency of film 7, onto lens 22. This lens focuses the beam onto the photo sensitive device 24, which converts the varying light intensities to an electrical signal. This signal drives the amplifier-modulator 18 which has a bandpass of at least 2.5 megacycles per second. This modulator is used to amplitude modulate the low power VHF oscillator 19 which produces a radio frequency output on a preselected frequency, which matches the frequency of an unused television channel. This RF energy is radiated from antenna 20. Power cord 50 supplies electrical energy from typically a 110 v. source to the power supply 21. This supply furnishes requisite voltages to the electronic circuits represented by oscillator 16, deflection circuits 17, amp-modulator 18, VHF oscillator 19 and cathode ray tube 15. Control 36 varies the beam current of cathode ray tube 15 and thus controls the intensity and spot size of the scanning spot of the tube.

Figure 5:
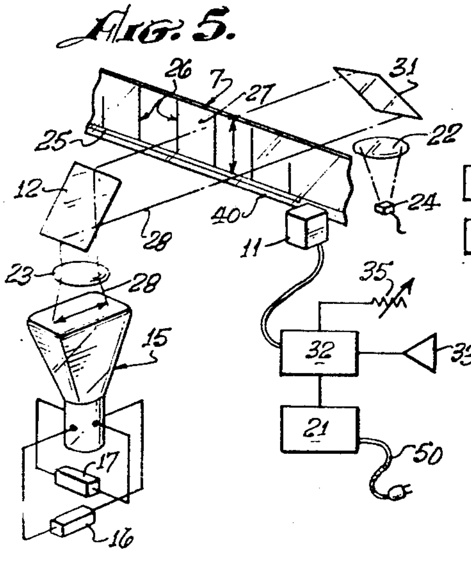
FIGURE 5 shows details of the scanning system, the film format and audio electronic elements.

FIGURE 5 shows the details of the scanning process. Cathode ray tube 15 produces scanning beam 28 which is focused into a parallel beam by lens 23. The beam 28 is reflected onto the film 7 by mirror 12. The beam now scans the film transverse to its motion. The images on the film intensity modulate the beam which is reflected by mirror 31. Lens 22 focuses the beam on optical detector 24 where the light fluctuations are converted into an electrical signal. The optical detector 24 may be typically a hard vacuum photo tube such as type 931 or a photo transistor with band pass characteristics of approximately 3.5 megacycles. The image on frame 27 on the film 7 has a range of optical density less than the scanning synchronization signals 25 and 26. The range of deflection of the beam can be adjusted so that synchronization signal band 25 is scanned each time beam 28 moves across film 7. The beam progresses into this synchronization signal band 25 for approximately five microseconds and thereby generates in photo detector 24 a horizontal synchronizing pulse which will synchronize the initiation of a horizontal scanning line in the viewing televison receiver. This horizontal synchronization signal band 25 which is scanned as a result of motion of the beam 28, and the vertical synchronization signal band 26 which occupies the space between frames 27 have optical intensities outside of the range used in frames 27 which carry the images to be projected on the viewing television. The frames 27 are spaced at distance such that the time spent in scanning vertical synchronization band 26 produces a pulse in the viewing television receiver which will trigger normal vertical scanning action.

In FIGURE 5 strip 40 is the magnetic recording strip which occupies the edge of film 7. This strip contains the prerecorded audio information which accompany the video images 27. Tape read head 11 converts the information stored on strip 40 to electrical signals which are amplified in audio amplifier 32, whose gain is adjusted by control 35 and played through loud speaker 33.

There are several alternatives to the preferred embodiment outlined above.

It is obvious that the film 7 may be printed double width approximately 16 millimeter so that two rows of images 27 occupy the film. In this embodiment the film 7 moves past the scanning beam 28 with a single row of images being scanned as described previously. At the expiration of the film 7 from supply reel 6, a reversal of the film drive is triggered and reel 6 becomes the take-up reel and the remaining row of images is scanned. In this embodiment an added track of audio information accompanies the added track of video in a relationship identical to that described for the single track apparatus.

Color images may be scanned and sensed by the apparatus by means of one of several obvious techniques. For example, three parallel rows of video images 27 may be deployed one above the other. The first of these represent one color of the spectrum typically yellow, the second red, and the third blue. The composite color signal produced by scanning these three tracks is reflected by mirror 31 and reconstituted in a composite color video signal by photo detector 24. A single audio track 40 would be required in this embodiment.

Another alternative involves the use of variable density recording of the audio information which accompanies the video signal. In this embodiment, track 40 is a variable density track printed optically on film 7. This track would be illuminated by an added light source and read by a photo cell capable of detecting audio frequencies such as a type 930 or a suitable photo transistor.

The audio signal itself generated by magnetic head 11 may be mixed with the video signal in modulator 18, the video producing amplitude modulation of the VHF signal and the audio, frequency modulation. Thus the radio frequency signal produced in VHF oscillator 19 produces synchronization, video, and audio components on a carrier frequency of an unused television channel.

It will be understood that my invention is not limited to the specific embodiment described and illustrated, but comprehends all modifications, improvements, and variations which fall within the scope of the appended claims.

What is claimed is:

1. A system for converting a motion picture film record into a television broadcast signal, said motion picture film defining a plurality of frames, each of which is enclosed at the sides by longitudinal frame borders and at the upstream and downstream ends by transverse frame borders, which borders have light densities outside the range of density employed for recording images within said frames, said system comprising:
a magazine for said film, including, a housing,
and reel means, to carry said film in relation to said housing;
a drive means for coupling to said reel means for supplying rotary drive motion to said reel means;
means for scanning a light beam transversely over said film;
photo detection means to detect the light intensity from said light beam passing through said film;
side border detection circuit means for detecting the limit of scanning motion when said light beam impinges on said borders; and
television signal generating means for generating a television signal from the modulation of said light beam by said film, as sensed by said photo detection means and said side border detection circuit means.

2. A system according to claim 1 wherein said drive means includes at least one wheel shaped so that said film is contacted only at the edges thereof.

3. A system according to claim 2 wherein said drive means further includes a motor for imparting continuous rotary motion to said reel means.

4. A system according to claim 1, wherein said film further includes a magnetic recording medium strip extending longitudinally and wherein said system further includes means to sense said strip to provide an audio component for said television signal.

5. A system according to claim 3, wherein said film further includes a magnetic recording medium strip extending longitudinally and wherein said system further includes means to sense said strip to provide an audio component for said television signal.

6. A system according to claim 1 including a television receiver with an open channel, and wherein said television signal generating means includes an oscillator for modulating said signal for reception by said open channel of said television receiver.

References Cited

UNITED STATES PATENTS

| | | | |
|---|---|---|---|
| 3,004,467 | 10/1961 | Zschau | 178—7.2 |
| 3,290,437 | 12/1966 | Goldmark et al. | 178—7.2 |

FOREIGN PATENTS

| | | |
|---|---|---|
| 821,163 | 9/1959 | Great Britain. |

RICHARD MURRAY, Primary Examiner

ALFRED H. EDDLEMAN, Assistant Examiner